US007069058B2

(12) United States Patent
Kawashima

(10) Patent No.: US 7,069,058 B2
(45) Date of Patent: Jun. 27, 2006

(54) MUSICAL COMPOSITION REPRODUCING APPARATUS PORTABLE TERMINAL MUSICAL COMPOSITION REPRODUCING METHOD AND STORAGE MEDIUM

(75) Inventor: Takahiro Kawashima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/296,856

(22) PCT Filed: May 28, 2001

(86) PCT No.: PCT/JP01/04450

§ 371 (c)(1), (2), (4) Date: Oct. 6, 2003

(87) PCT Pub. No.: WO01/93245

PCT Pub. Date: Dec. 6, 2001

(65) Prior Publication Data

US 2004/0051646 A1 Mar. 18, 2004

(30) Foreign Application Priority Data

May 29, 2000 (JP) ............................ 2000-158054

(51) Int. Cl.

| | |
|---|---|
| *H04B 1/38* | (2006.01) |
| *H04M 1/00* | (2006.01) |
| *G08B 23/00* | (2006.01) |
| *G10H 1/00* | (2006.01) |
| *G10H 1/18* | (2006.01) |

(52) U.S. Cl. ................ 455/567; 455/575.1; 340/693.3; 84/615; 84/618

(58) Field of Classification Search ................ 455/567, 455/575.1; 340/693.3; 84/615, 618

See application file for complete search history.

(56) References Cited

U.S. PATENT DOCUMENTS 5,252,774 A * 10/1993 Hasebe et al. ................ 84/618

(Continued)

FOREIGN PATENT DOCUMENTS

EP 1304678 A1 * 4/2005

(Continued)

OTHER PUBLICATIONS

Japanese Patent Office, Office Action, Feb. 17, 2004.

(Continued)

*Primary Examiner*—William D. Cumming
(74) *Attorney, Agent, or Firm*—Pillsbury Winthrop Shaw Pittman LLP

(57) ABSTRACT

There is provided a musical composition-reproducing device and a musical composition-reproducing method that make it possible to make the most of many sounding channels and are capable of imparting an effect to musical tones without providing a special effect circuit. Musical composition data read from a musical composition data file FL is read out as data of a track 1 comprised of 4 channels, and is also copied and read out as data of a track 2, a track 3 and a track 4. Delay times of delaying means D1 to D3 and attenuations of attenuating means G1 to G3 are determined as being values t1 to t3 and g1 to g3, respectively, in accordance with effect parameter information. A sequencer SQ reproduces three effect sounding sequence data in the tracks 2 to 4, which is delayed by the delay times t1 to t3 and attenuated by the attenuations g1 to g3, as an effect sound providing a reverberation to musical tones reproduced based on the sequence data in the track 1 by using 12 channels among 16 channels.

9 Claims, 7 Drawing Sheets

U.S. PATENT DOCUMENTS

| | | | | |
|---|---|---|---|---|
| 6,162,983 | A * | 12/2000 | Takahashi | 84/615 |
| 6,597,928 | B1 * | 7/2003 | Ito | 455/567 |
| 2004/0051646 | A1 * | 3/2004 | Kawashima | 340/693.3 |
| 2004/0176149 | A1 * | 9/2004 | Futohashi | 455/575.1 |

FOREIGN PATENT DOCUMENTS

| | | |
|---|---|---|
| JP | 05-313667 | 5/1992 |
| JP | 06-130954 | 5/1994 |
| JP | 2000-56762 | 2/2000 |
| JP | 2000-75863 | 3/2000 |

OTHER PUBLICATIONS

Japanese Patent Office, Decision of Rejection, May 28, 2004.

* cited by examiner

FIG. 5

・EVENT

| TYPE | 1ST BYTE (STATUS) | 2ND BYTE |
|---|---|---|
| CONTROL EVENT | 0 0 0 0 0 0 0 0 | n n m m y y y y |
| NOTE EVENT | n n o o x x x x | g g g g g g g g |

n n : CHANNEL NUMBER (1~4)
o o : OCTAVE INFORMATION
x x x x : NOTE INFORMATION
mm : TYPE OF CONTROL EVENT

| mm | TYPE OF CONTROL EVENT |
|---|---|
| 0 0 | GAIN |
| 0 1 | PITCH BEND |
| 1 0 | ANOTHER MESSAGE |
| 1 1 | ANOTHER MESSAGE |

y y y y : VALUE (CONTROLLED VARIABLE)
g g g g g g g g : GATE TIME (LENGTH OF TONE GENERATION)

FIG. 6

EFFECT INFORMATION

| |
|---|
| EFFECT IMPARTING INFORMATION |
| EFFECT IMPARTING SEQUENCE INFORMATION |
| EFFECT TYPE INFORMATION |
| EFFECT PARAMETER INFORMATION |
| EFFECT PARAMETER-EDITING INFORMATION |

MUSICAL COMPOSITION REPRODUCING APPARATUS PORTABLE TERMINAL MUSICAL COMPOSITION REPRODUCING METHOD AND STORAGE MEDIUM

TECHNICAL FIELD

This invention relates to a musical composition-reproducing device, a portable terminal device having the musical composition-reproducing device, a musical composition-reproducing method, and a storage medium storing a program for executing the method, and more particularly to those which can be suitably applied to a car telephone and a cellular phone.

BACKGROUND ART

In a cellular phone system, such as a PDC (Personal Digital Cellular telecommunication system), known as an analog cellular system or a digital cellular system, and a PHS (Personal Handyphone System), when a cellular phone or mobile phone device carried by a user receives an incoming call, an alert sound is generated to notify the user of the incoming call. As the alert sound, a beep has been conventionally used, but recently, music including a melody has come to be used in place of the beep since the beep is offensive to the ear.

A conventional mobile phone device that is capable of reproducing a melody is equipped with a musical composition-reproducing device that is capable of playing automatic performance. The musical composition-reproducing device generally includes a CPU (Central Processing Unit), a ROM (Read Only Memory), a RAM (Random Access Memory), and a musical composition reproducing section. The CPU executes an automatic performance program read from the ROM, thereby reading data of a musical composition from the ROM or the RAM, and setting tone generation parameters to the musical composition reproducing section to reproduce the musical composition.

To reproduce high-quality musical tones, some of the recent musical composition-reproducing devices are capable of reproducing a musical composition composed of a plurality of channels.

A musical composition-reproducing device provided in an electronic musical instrument or the like has many sounding channels such as 32 channels, 64 channels and 128 channels. The musical composition-reproducing device provided in the mobile phone device, which is capable of reproducing music including a melody, however, had only one sounding channel because the reduction in size took the highest priority in developing mobile phone devices. Recently, there is known a mobile phone device having four sounding channels, and the number of sounding channels in mobile phone devices has been increased gradually. The provided musical composition data, however, is still composed of only a small number of channels because the currently spreading mobile phone devices are capable of reproducing only a small number of channels. Thus, in a musical composition-reproducing device that is capable of reproducing many sounding channels and a mobile phone device of a recent model having this musical composition-reproducing device, some sounding channels are used with only a low frequency. It is therefore meaningless to provide those sounding channels.

Conventionally, an effect such as a reverberation and a chorus is given to the reproduced musical tones by a special effect circuit. That is, there is the necessity of providing an effect circuit in the cellular phone in order to give an effect to an incoming call melody, etc. It is therefore difficult to give an effect to musical tones in the cellular phone that is required to be compact in size.

It is therefore an object of the present invention to provide a musical composition-reproducing device, a portable terminal device having the musical composition-reproducing device and a musical composition-reproducing method, which make it possible to make the most of sounding channels if many sounding channels are provided, and a storage medium for executing the method.

It is another object of the present invention to provide a musical composition-reproducing device, a portable terminal device having the musical composition-reproducing device and a musical composition-reproducing method, which make it possible to impart an effect to musical tones without providing a special effect circuit, and a storage medium storing a program for executing the method.

DISCLOSURE OF INVENTION

To attain the above objects, the present invention provides a musical composition-reproducing device comprising musical composition-reproducing means for reproducing musical composition data composed of sequence data each comprised of n (n is an integer) channels, said musical composition-reproducing means having a plurality of sounding channels, detecting means for detecting the number of said sequence data, and control means for controlling the musical composition-reproducing means so as to reproduce the musical composition data composed of the sequence data when the detected number of sequence data is smaller than the number of sequence data that can be reproduced by the sounding channels while carrying out effect sounding related to musical tones generated by reproducing the sequence data, by using at least one free channel among the plurality of sounding channels.

In a preferred embodiment of the present invention, the control means controls the musical composition-reproducing means so as to copy the at least one sequence data and change control information for sequence data obtained by the copying according to at least one effect parameter to thereby generate at least one effect imparting sequence data, and reproduce the at least one sequence data and the generated at least one effect imparting sequence data.

To attain the above objects, the present invention provides a musical composition-reproducing device comprising musical composition-reproducing means for reproducing musical composition data composed of sequence data each comprised of n (n is an integer) channels, said musical composition-reproducing means having n×m (m is an integer of not less than 2) sounding channels, control means for controlling said musical composition-reproducing means so as to reproduce the musical composition data composed of the sequence data while carrying out effect sounding related to musical tones generated by reproducing the sequence data, by using at least one free channel among the n×m sounding channels, wherein said control means controls said musical composition-reproducing means so as to copy the at least one sequence data and change control information for sequence data obtained by the copying according to at least one effect parameter to thereby generate at least one effect imparting sequence data, and reproduce the at least one sequence data and the generated at least one effect imparting sequence data;

wherein if effect information is added to the at least one sequence data, said control means controls said musical composition-reproducing means so as to change the sequence data obtained by the copying, according to at least one effect parameter based on the effect information to thereby generate the at least one effect imparting sequence data, and reproduce the at least one sequence data and the generated at least on effect imparting sequence data; and wherein if the musical composition data is composed of the at least one sequence data and the at least one effect imparting sequence data, said control means controls said musical composition-reproducing means so as to reproduce the at least one sequence data and the at least one effect imparting sequence data without generating any effect imparting sequence data.

To attain the above objects, the present invention also provides a musical composition-reproducing device comprising a musical composition-reproducing means for reproducing musical composition data composed of m sequence data each comprised of n (n is an integer) channels, the musical composition-reproducing means having n×m (m is an integer of not less than 2) sounding channels, and control means for controlling the musical composition-reproducing means so as to reproduce k (k is a smaller integer than m) sequence data among the m sequence data while carrying out effect sounding related to musical tones generated by reproducing the k sequence data, by using n×(m−k) sounding channels that have been freed among the n×m channels.

To attain the above objects, the present invention further provides a portable terminal device comprising one of the above musical composition-reproducing devices according to the present invention, and the musical composition-reproducing device reproduces the musical composition data to thereby output an incoming call melody or a hold sound provided with the at least one effect.

To attain the above objects, the present invention also provides a portable terminal device comprising one of the above musical composition-reproducing devices according to the present invention, storage means storing the musical composition data, and reading means for reading the musical composition data from the storage means, and the musical composition-reproducing device reproduces the musical composition data read by the reading means to thereby reproduce a musical composition provided with the least one effect.

To attain the above objects, the present invention provides a musical composition-reproducing method comprising a musical composition-reproducing step of reproducing musical composition data composed of sequence data composed of n (n is an integer) channels, by using a plurality of sounding channels, a detecting step of detecting the number of said sequence data, and a control step of controlling the musical composition-reproducing step so as to reproduce the musical composition data composed of the sequence data when the detected number of sequence data is smaller than the number of sequence data that can be reproduced by the sounding channels while carrying out effect sounding related to musical tones generated by reproducing the sequence data, by using at least one free channel among the plurality of sounding channels.

To attain the above objects, the present invention also provides a musical composition-reproducing method comprising a musical composition-reproducing step of reproducing musical composition data composed of m sequence data each comprised of n (n is an integer) channels, by using n×m (m is an integer of not less than 2) sounding channels, and a control step of controlling the musical composition-reproducing step so as to reproduce k (k is a smaller integer than m) sequence data among the m sequence data while carrying out effect sounding related to musical tones generated by reproducing the k sequence data, by using n×(m−k) sounding channels that have been freed among the n×m channels.

To attain the above objects, the present invention provides a musical composition-reproducing method comprising:

a musical composition-reproducing step of reproducing musical composition data composed of sequence data each comprised of n (n is an integer) channels, by using a plurality of sounding channels;

a detecting step of detecting the number of said sequence data; and a control step of controlling said musical composition-reproducing step so as to reproduce the musical composition data composed of the sequence data when the detected number of sequence data is smaller than the number of sequence data that can be reproduced by the sounding channels while carrying out effect sounding related to musical tones generated by reproducing the sequence data, by using at least one free channel among the plurality of sounding channels.

To attain the above objects, the present invention provides a storage medium storing a program for executing one of the above musical composition-reproducing methods according to the present invention.

According to the present invention that is constructed in the above-mentioned manner, when musical composition data composed of sequence data is reproduced, the number or sequence data is detected and if the detected number of sequence data is smaller than the number of sequence data that can be produced by the sounding channel, an effect sounding operation is performed to impart an effect to musical tones that are reproduced, by using free sounding channels. This makes it possible to make the most of sounding channels provided in the musical composition-reproducing device.

Further, even if musical composition data is composed of a plurality of pieces of sequence data and there is no free sounding channel when the musical composition data is reproduced, the number of sequence data reproduced is reduced to enable the effect sounding imparting an effect to musical tones that are reproduced, by using sounding channels having been freed as a result of the reduction.

Thus, according to the present invention, an effect is not imparted by a special effect circuit but is imparted by performing the effect sounding using free or freed sounding channels. This eliminates the necessity of providing a special effect circuit. Therefore, the present invention can be suitably applied to a cellular phone that is required to be compact in size.

BRIEF DESCRIPTION OF DRAWINGS

FIG. 5 is a diagram showing the format of event data in the sequence data of the musical composition data based on which a musical composition is reproduced by the musical composition-reproducing section;

FIG. 6 is a diagram showing the format of effect information on the musical composition data based on which a musical composition is reproduced by the musical composition-reproducing section;

BEST MODE OF CARRYING OUT THE INVENTION

The present invention will now be described in detail with reference to the drawings showing embodiments thereof.

Figure 1:
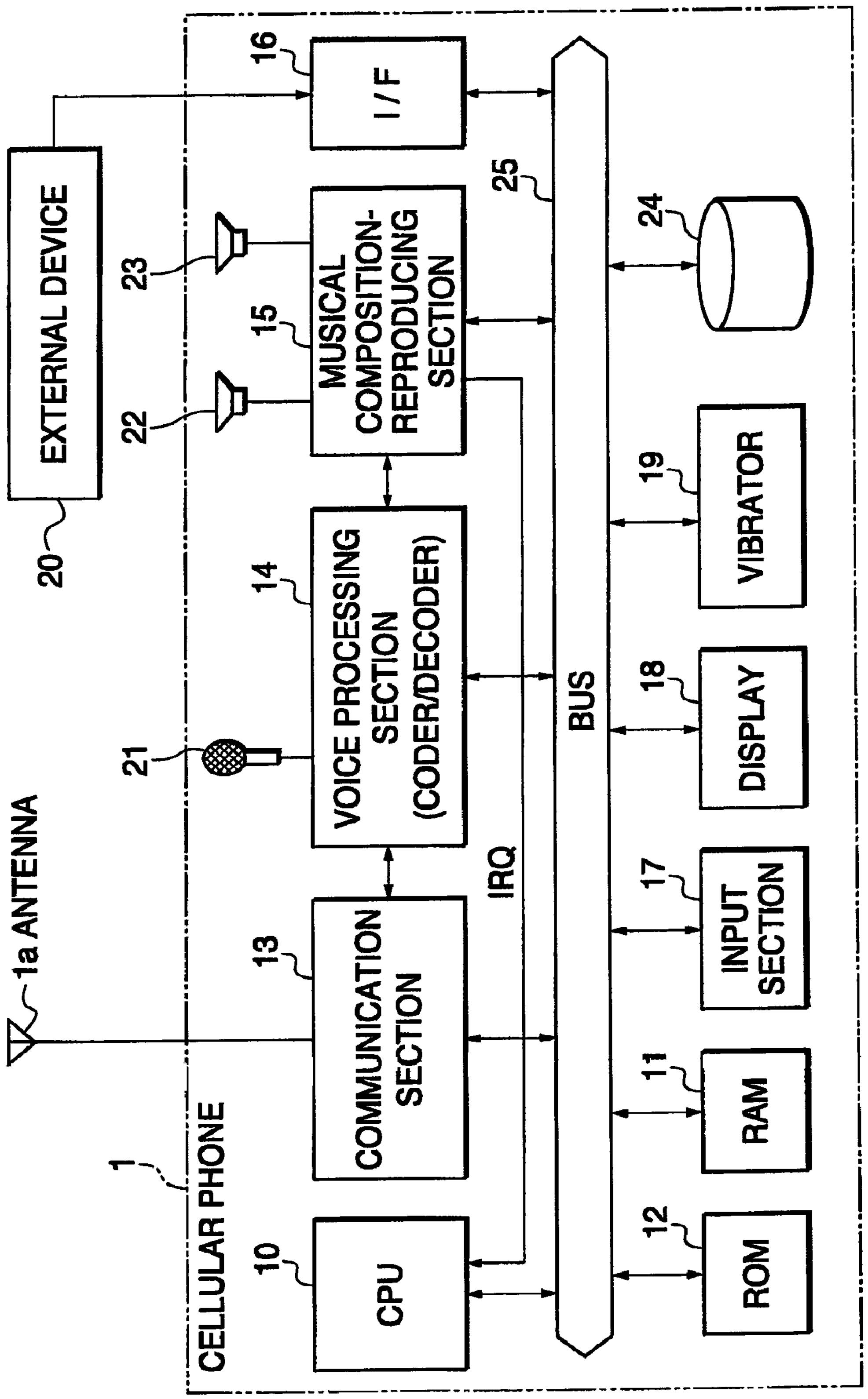
FIG. 1 is a block diagram showing the arrangement of a cellular phone device to which is applied a portable terminal device according to an embodiment of the present invention having a musical composition-reproducing device of the present invention.

FIG. 1 is a block diagram showing the arrangement of a cellular phone device to which is applied a mobile device according to an embodiment of the present invention having a musical composition-reproducing device of the present invention.

The cellular phone 1 in FIG. 1 includes a known antenna 1*a*, which is usually configured to be retractable, and connected to a communication section 13 having a modulating/demodulating function. A system CPU (Central Processing Unit) 10 controls the operations of component parts of the cellular phone 1 by executing telephone function programs, and includes a timer, not shown, for indicating a time period elapsed during operation thereof and generating a timer interrupt at predetermined time intervals. Further, the system CPU 10 carries out an effect imparting process that will be described later, and a process for aiding a musical composition-reproducing process in response to an intervention required (IRQ) signal. A system RAM (Random Access Memory) 11 has allocated thereto a musical composition data storage area for storing musical compositions each composed of a plurality of parts downloaded from a download center, not shown, or the like, a user setting data storage area for storing data set by the user, a work area for operation of the system CPU 10, and the like. A system ROM (Read Only Memory) 12 stores various telephone function programs for sending and receiving messages, and other programs for carrying out the effect imparting process, the process for aiding the musical composition-reproducing process, and others, and various data such preset musical composition data, the programs being executed by the CPU 10.

Further, a communication section 13 carries out demodulation of a signal received by the antenna 1*a*, and modulation of a signal to be transmitted via the antenna 1*a* to supply the modulated signal to the antenna. A received speech signal demodulated by the communication section 13 is decoded by a voice processing section (coder/decoder) 14, while a speech signal input via a microphone 21 is compression-encoded by the same. The voice processing section 14 carries out compression-encoding/decoding of speech with high efficiency, and is implemented by a coder/decoder based on a CELP (Code Excited LPC) or an ADPCM (Adaptive Differential Pulse Code Modulation) method. A musical composition-reproducing section 15 of the musical composition-reproducing device according to the present invention causes the received speech signal to be sounded via a received speech speaker 22, or reproduces musical composition data as an incoming call melody, a hold sound or a BGM. The incoming call melody and the BGM are sounded via an incoming call speaker 23, while the hold sound is sounded via the received speech speaker 22.

The musical composition data, which is reproduced by the musical composition-reproducing section 15, is comprised of one or more pieces of sequence data and effect information. Each sequence data is composed of 4-channel performance data. The musical composition-reproducing section 15 reproduces musical tones according to the sequence data. When a predetermined amount of a free area is formed in a FIFO serving as storage means for the sequence data during reproduction of the musical tones, the musical composition-reproducing section 15 sends an intervention required (IRQ) signal to the system CPU 10. In response to the IRQ signal, the system CPU 10 reads out a continued portion of the sequence data stored in a musical composition data file section 24, etc. and forwards the same to the musical composition-reproducing section 15. An interface (I/F) 16 provides interface for use in downloading data of musical composition data, etc. each composed of one or more pieces of sequence data from an external device 20 such as a personal computer. An input section 17 is comprised of dial buttons for inputting numerical values "0" to "9", respectively, and other buttons, which are provided in the mobile phone device 1.

Further, a display 18 displays a menu of telephone functions, and images associated with operations of respective buttons including the dial buttons. A vibrator 19 vibrates the body of the cellular phone 1 instead of sounding an incoming call sound upon receipt of an incoming call to notify the user of the incoming call. The musical composition file section 24 is comprised of a storage device having a large storage capacity, and stores musical composition data acquired by downloading and the like. The musical composition data file section 24, however, may be omitted from the mobile phone device 1. The above-mentioned respective functional blocks send and receives data and instructions via a bus 25.

Figure 2:
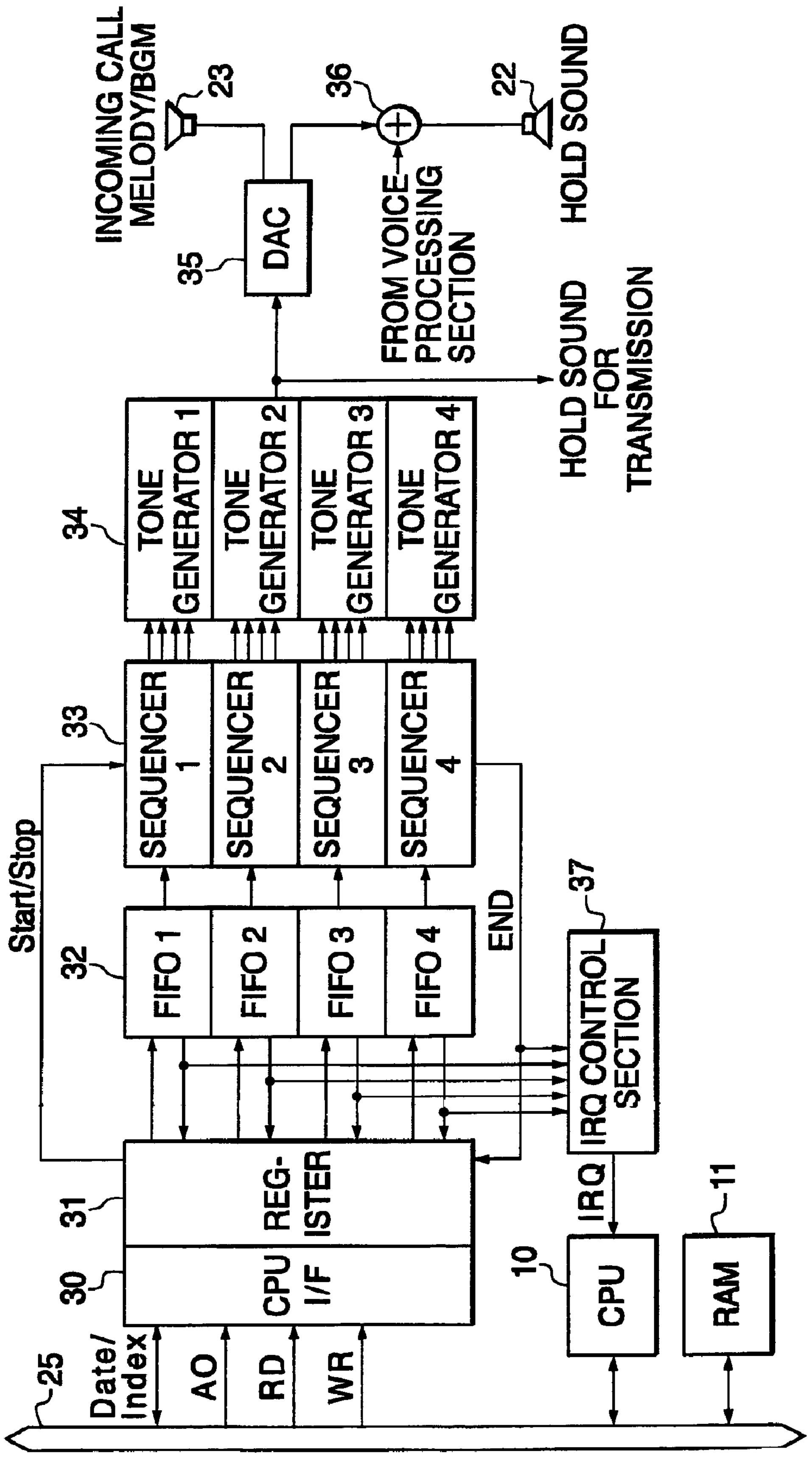
FIG. 2 is a diagram showing a configuration of a musical composition-reproducing section of the musical composition-reproducing device according to the present invention provided in the mobile phone device in FIG. 1.

FIG. 2 shows a first configuration of the musical composition-reproducing section 15 of the musical composition-reproducing device according to the present invention. Before describing this configuration, the structure of musical composition data which is reproduced by the musical composition-reproducing section 15 will be described with reference to FIG. 3.

Figure 3:
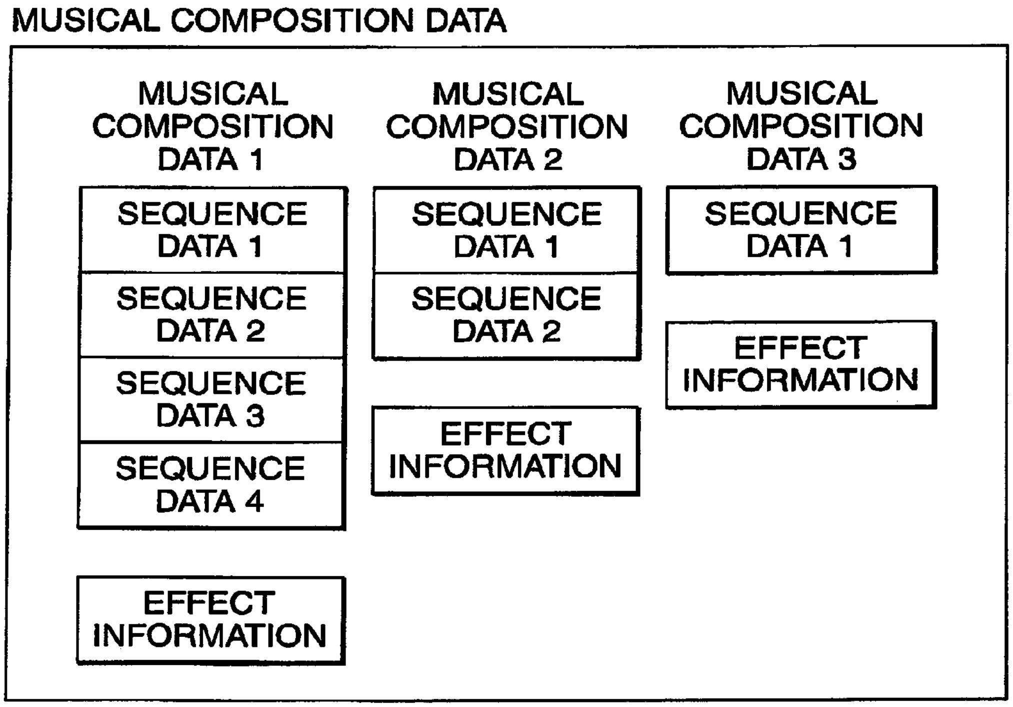
FIG. 3 is a diagram showing the structure of musical composition data base on which a musical composition is reproduced by the musical composition-reproducing section.
Figure 4:
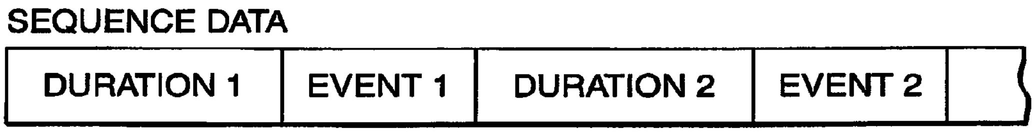
FIG. 4 is a diagram showing the format of sequence data forming the musical composition data based on which a musical composition is reproduced by the musical composition-reproducing section.

Musical composition data 1, musical composition data 2 and musical composition data 3 in FIG. 3 are stored in the musical composition data file section 24. As shown in FIG. 3, the musical composition data 1 to 3 are each composed of one or more pieces of sequence data and effect information. Each sequence data is composed of 4-channel performance data: for example, a melody part, an accompaniment part 1, an accompaniment part 2, and a rhythm part. Each sequence data is used for controlling the tone generation of 4 channels. As shown in FIG. 4, each sequence data is formed by alternately arranging duration data and event data. With this arrangement, the sequence data forming the musical composition data 1 is composed of four pieces of sequence data 1 to 4, the sequence data forming the musical composition data 2 is composed of two pieces of sequence data 1 to 2, and the sequence data forming the musical composition data 3 is composed of one piece of sequence data 1. The musical composition-reproducing section 15 has, for example, 16 sounding channels so as to reproduce musical compositions based on the above musical composition data.

The duration data in the sequence data is indicative of a time interval between adjacent events. As shown in FIG. 5, there are two kinds of event data: control events and note events. In the control event, the 1st byte as a status byte is represented by "0000 0000", and the next 2nd byte is represented by "nnmm yyyy". The characters "nn" represent a channel number indicative of one channel among the first to fourth channels, and the characters "mm" indicate the type of a control event. As shown in FIG. 5, if the characters "mm" are represented as "00", it indicates a control event for controlling a gain. If the characters "mm" are represented as "01", it indicates a control event for controlling a pitch bend. If the characters "mm" are represented as "10" or "11", it indicates a control event relating to another message. Further, the characters "yyyy" represent a controlled variable. If the characters "mm" are represented as "00", it indicates a controlled variable of a gain, and if the characters "mm" are represented as "01", it indicates a controlled variable of a pitch bend. If the sequence data is reproduced after the gain or the pitch bend is changed according to the control event, the controlled variable after the change is applied to the gain or the pitch bend. According to the present invention, the control event is used to provide an effect as described later.

The 1st byte of the note event is represented by "nnoo xxxx", and the 2nd byte is represented by "gggg gggg". As mentioned above, the characters "nn" represent a channel number indicative of one channel among the first to fourth channels. The characters "oo" represent octave information, and the characters "xxxx" represent note information. Musical interval and musical scale for use in sounding are represented by "oo xxxx". The characters "gggg gggg" represent a time corresponding to a gate time (length of tone generation).

The effect information attached to the musical composition data stored in the system RAM 11 or the musical composition data file section 24 is composed of effect imparting information, effect imparting sequence information, effect type information, effect parameter information and effect parameter-editing information as shown in FIG. 6. The effect imparting information indicates whether an effect sounding with an effect imparted should be performed or a normal sounding should be performed without an effect. The effect imparting sequence information indicates a number (1 to 4) of sequence data to which an effect is to be applied. The effect type information indicates the type of an effect to be applied, such as a reverberation and a chorus. The effect parameter information indicates which parameters will be used between preset effect parameters and effect parameters edited by a user. The effect parameter-editing information indicates effect parameters edited by an effect parameter-editing process.

The effect information is configured or set by the user beforehand and is attached to the sequence data and stored in the system RAM 11 or the musical composition data file section. In response to an instruction for reproducing the musical composition data, effect imparting sequence data is generated according to the effect information and is reproduced by the musical composition-reproducing section 15 together with the sequence data to which an effect will be applied, so that musical tones provided with the effect can be reproduced (effect sounding).

Alternatively, the effect imparting sequence data may be generated in advance according to the effect information and may be stored together with the musical composition data in the system RAM 11 or the musical composition data file section 24. In this case as well, the musical composition-reproducing section 15 reproduces the effect imparting sequence data together with the sequence data to which an effect will be applied, so that musical tones provided with the effect can be reproduced.

In a typical embodiment, an effect is only given to one sequence data. If sequence data to which an effect is to be applied is selected, the effect sounding is carried out by using all the freed channels at the sacrifice of sound production based on the other sequence data. According to present invention, however, an effect should not necessarily be given to only one sequence data, but it may be given to a plurality of sequence data.

The musical composition data can be downloaded from a distribution center or the like, and the distributed musical composition data is normally composed only of sequence data. Accordingly, upon receipt of the musical composition data, the number of sequence data in the musical composition data is detected. Only when the detected number of sequence data is smaller than the number of sequence data that can be reproduced by the musical composition-reproducing device provided in the portable terminal device, the effect information is produced according to the preset effect parameters and is stored together with the musical composition data in the system RAM 11 or the musical composition data file section 24. In this case, the preset effect parameters are preferably included in the distributed musical composition data.

Further, the distribution center may distribute the musical composition data provided with the effect information to the portable terminal device having the musical composition-reproducing device. Prior to the distribution, the distribution center may acquire information on the number of sounding channels of the musical composition-reproducing device provided in the portable terminal device, compare the number of sounding channels indicated by the acquired information with the number of sequence data in requested musical composition data and then produce the effect information according to the result of the comparison. For example, if the acquired information indicates that the number of sounding channels is 16 and the number of sequence data in the requested musical composition data is 1 (4 channels), the distribution center produces the effect information for imparting an effect and distributes the musical composition data provided with the produced effect information.

The musical composition-reproducing section 15 in FIG. 2 is capable of reproducing musical composition data that is composed of 4 or less sequence data as shown in FIG. 3.

The musical composition-reproducing section 15 is comprised of a CPU interface (CPU I/F), a register 31 composed of a plurality of registers, a FIFO (First-in First-out) group 32 composed of FIFOs 1 to 4, a sequencer group 33 composed of sequencers 1 to 4, a tone generator 34 composed of tone generators 1 to 4, a digital-to-analog converter (DAC) 35, a mixer 86, and an IRQ control section 37.

The CPU interface 30 is connected to the system CPU 10 via an 8-bit data line (Data/Index), an address control line (A0), a readout control line (RD), and a write control line (WR). The address control line (A0) indicates whether a signal on the data line (Data/Index) is data or an index. The index is information indicating the address of one of the registers in the register 31. The index and the data are sequentially written into the CPU interface 30 via the data line (Data/Index), so that the data is written into the register corresponding to the index in the register 31. In this case, a signal on the data line (Data/Index) is determined according to a signal on the address control line (A0). After the index is thus written into the CPU interface 30 via the data line (Data/Index), a readout instruction is sent via the readout control line (RD), so that the stored data is read out from the register corresponding to the index in the register 31.

The register 31 includes a sequencer control register, a sequence data register, and a status register. Sequencer control data for controlling the sequencer group 33 is written into the sequencer control register by the system CPU 10. The sequencer control data written into the sequencer control register includes sequencer operation start instruction data (Start) for giving an instruction for starting the reproduction of musical tones and sequencer stop instruction data (Stop) for giving an instruction for terminating the reproduction of musical tones.

One or more pieces of sequence data forming the musical composition data are temporarily stored in the sequence data register by the system CPU 10. The musical composition data written into the sequence data register is written into the FIFO group 32. The musical composition data written into the register 31 is composed only of the sequence data. If the musical composition data is composed of a plurality of sequence data, the first to fourth sequence data 1, 2, 3 and 4 are written into the FIFO 1, 2, 3 and 4, respectively.

The status register indicates a musical composition-reproducing state of the musical composition-reproducing section 15. The status register includes a sequence data Full flag that is outputted from the FIFO 1 to the FIFO 4 in the FIFO group 32, a sequence data IRQ flag (IRQ), and a sequence data END flag (END) that is outputted from the sequencer group 33. The status register is read out by the system CPU 10.

For example, the FIFOs 1 to 4 in the FIFO group 32 each have a capacity of 32 bytes (32×8 bits). The selected sequence data are sequentially written into the FIFOs 1 to 4 via the sequence data register in the register 31, and are sequentially read out from the FIFOs 1 to 4 by the sequencers 1 to 4 in the sequencer group 33 in an order in which they are written. The sequence data read out by the sequencers 1 to 4 in the sequencer group 33 are discarded from the FIFO group 32. The FIFO group 32 has a function of monitoring the amount of the stored sequence data as well as the above-mentioned FIFO function. More specifically, if the amount of the stored sequence data is 32 bytes (full state), the FIFO group 32 generates a sequence data Full signal to set the sequence data Full flag in the status register in the register 31. Further, if the amount of the stored sequence data becomes equal to or smaller than an amount that is preset by the system CPU 10 (e.g. 8 bytes), the FIFO group 32 generates a sequence data IRQ signal to set the sequence data IRQ flag in the status register in the register 31. The sequence data IRQ signal is also supplied to the IRQ control section 37 to notify the CPU 10 of this fact.

When the sequencer operation start instruction data is written into the sequencer control register in the register 31 from the CPU 10, the sequencer group 33 operates as outlined below in accordance with the instruction. Prior to the sequencer operation start instruction, however, some sequence data must be written into at least the FIFO group 32. In the following description, it is assumed that the number of sequence data is 4.

1) Duration data 1 and event data 1 at the leading end of the respective sequence data stored in the FIFOs 1 to 4 in the FIFO group 32 are taken into the respective sequencers 1 to 4 in the sequencer group 33.

2) After waiting for the elapse of a waiting time corresponding to the duration data 1, the event data 1 is interpreted. If the event data 1 indicates a note event, sounding parameters for 4 channels such as start/stop data and volume data based on the note event 1 are written into a corresponding one of the tone generators 1 to 4 in the tone generator group 34. In the same timing as above, duration data 2 and event data 2 are then taken into the respective sequencers 1 to 4 so as to prepare for a next reproducing operation by waiting for the elapse of a waiting time corresponding to the duration data 2.

If the event data 1 indicates a control event, a designated type of control is executed for a designated channel by a controlled variable included in the control event. For example, if a gain control for the channel 1 is designated, a gain of the channel 1 is changed according to the controlled variable, and if a pitch bend control for the channel 1 is designated, a pitch bend of the channel 2 is changed according to the controlled variable.

3) After waiting for the elapse of a time corresponding to a gate time included in the note event 1, the reproducing process executed by the corresponding one of the tone generators 1 to 4 in the tone generator group 34 is terminated.

4) The same reproducing process is executed on the event data 2. This reproducing process is executed on all of the sequence data 1 to 4. When it is determined that the reproducing process for these sequence data have ended, the sequencer group 33 and the tone generator group 34 are caused to stop operating and all the data in the FIFO group 32 are cleared. The sequencer group 33 generates the sequence data END signal to set the sequence data END flag in the status register in the register 31. By referring to this flag, the system CPU 10 can provide the sequence data for the next musical composition data.

When the sounding parameters for 4 channels such as start/stop data and volume data are written into the tone generators 1 to 4 in the tone generator group 34 from corresponding ones of the sequencers 1 to 4 in the sequencer group 33, the tone generators 1 to 4 start or terminate the reproduction of 4 sounding channels. According to the sounding parameters, the tone generators 1 to 4 generate and output PCM waveform data of 16 channels.

The PCM waveform data of 16 channels reproduced by the tone generator group 34 are synthesized and converted to an analog musical tone signal by the digital-to-analog converter (ADC) 35. On this occasion, if the musical composition-reproducing section 15 reproduces an incoming melody/BGM, the reproduced musical tones are sounded by the incoming call speaker 23. If the musical composition-reproducing section 15 reproduces a hold sound, the reproduced musical tones are sounded by the received speech speaker 22. If the hold sound is reproduced, the mixer 36 mixes the hold sound and a received speech signal from the voice processing section 14 and then the mixed sound is sounded by the received speech speaker 22. If the hold sound is reproduced, a hold sound for transmission outputted from the tone generator group 34 is supplied to the voice processing section 4 and is compression-coded with high efficiency and sent to a telephone of the calling party.

When the IRQ control section 37 receives the sequence data IRQ signal from the FIFOs 1 to 4 in the FIFO group 32, i.e. when the amount of sequence data stored in the FIFOs 1 to 4 in the FIFO group 32 becomes equal to or smaller than a predetermined amount, the IRQ control section 37 supplies the IRQ signal to the system CPU 10. In response to the IRQ signal, the system CPU 10 finds a factor leading to the supply of the IRQ signal with reference to the sequence data IRQ flag in the status register in the register 31 and then takes an appropriate measure in accordance with the factor. If the sequence data IRQ flag is set and the shortage of sequence data in the FIFO 1 in the FIFO group 32 is detected as being the factor leading to the supply of the IRQ signal, the system CPU 10 forwards the sequence data 1 of 32 bytes−8 bytes=24 bytes. A continued portion of the sequence data 1 is read out and forwarded from the system RAM 11 or the musical composition data file section 24.

The sequence data of 24 bytes need not be transferred immediately, and all the sequence data of 24 bytes need not be transferred. The sequence data of 24 bytes may be transferred in such a timing and by such an amount as to enable the musical composition-reproducing section 15 to reproduce the tones without a break.

As stated above, when the system CPU 10 gives an instruction for starting the reproduction of musical tones to the musical composition-reproducing section 15 in FIG. 2 according to the present embodiment, the sequencer group 33 detects this instruction to cause the musical composition-reproducing section 15 to start the reproduction. The system CPU 10 gives the instruction for starting the reproduction in a case where an instruction for reproducing a BGM is given by operating a reproduction key in the cellular phone 1 and a case where an instruction for reproducing an incoming call sound (an incoming call melody) is given upon receipt of an incoming call notification. The system CPU 10 also gives the instruction for starting the reproduction in a case where an instruction for reproducing a hold sound is given by operating a hold operation key.

There will now be described the reproduction of musical tones provided with an effect according to the present invention. The musical tones are reproduced by the above-mentioned musical composition-reproducing section 15 according to the present invention. First, a description will be given of the arrangement of an artificial effecter formed by the musical composition-reproducing section 15.

Figure 7:
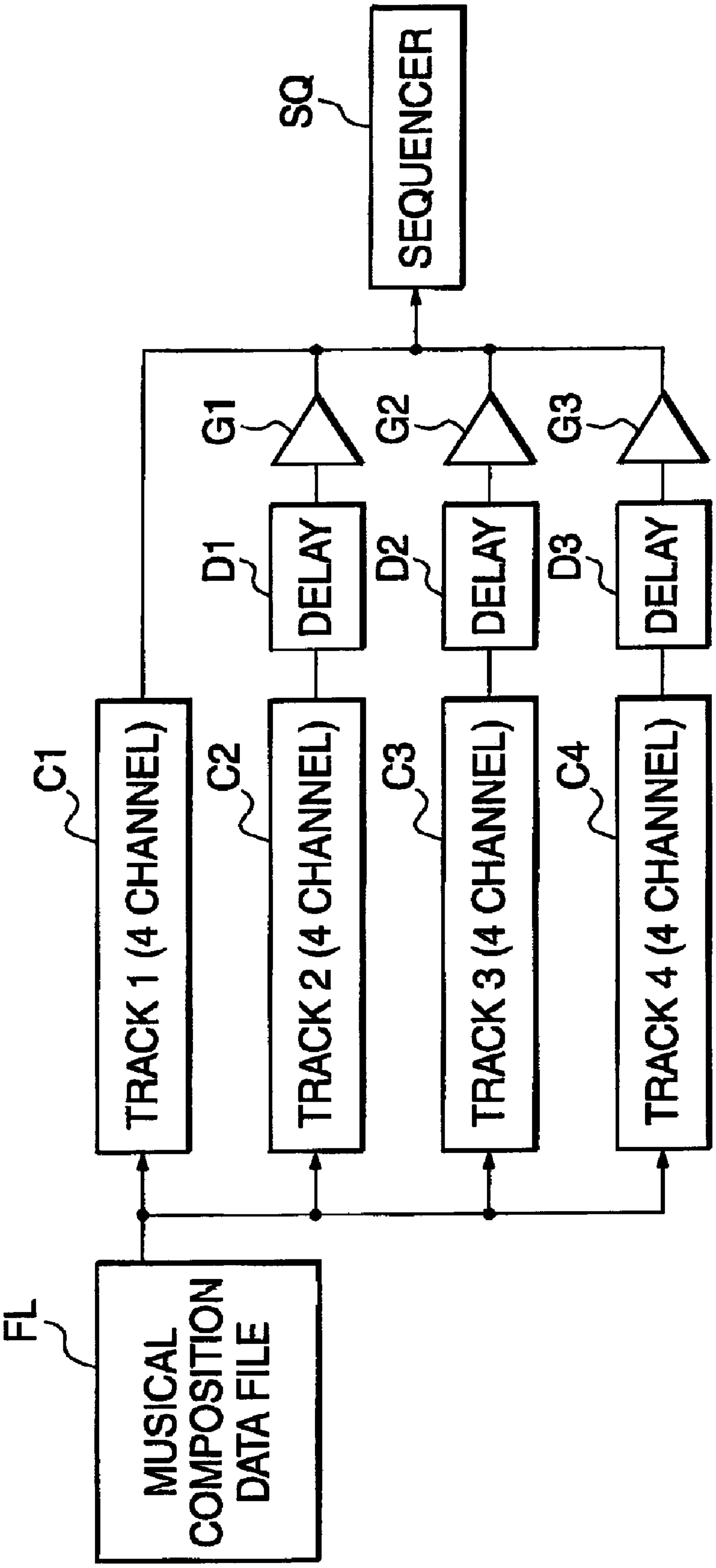
FIG. 7 is a diagram showing the arrangement of an artificial effecter that forms a part of a musical composition-reproducing device according to the present invention and is used to give a reverberation effect to musical tones.

FIG. 7 shows the arrangement of the artificial effecter for use in applying a reverberation to musical tones. In FIG. 7, musical composition data read out from a musical data file FL is sequence data 1 composed of e.g. 4 channels. The sequence data 1 is read out as data of a 4-channel track 1 (Track 1) and is copied to be read out as data of a 4-channel track 2 (Track 2), data of a 4-channel track 3 (Track 3) and data of a 4-channel track 4 (Track 4). The system CPU 10 executes this process when it is determined that the effect imparting information in musical composition data to be reproduced indicates an instruction for performing the effect sounding and the effect imparting sequence information indicates an instruction for imparting an effect to the sequence data 1.

Then, a reverberation is designated according to the effect type information, and a delay time t1 of a delay means D1 for the track 2, a delay time t2 of a delay means D2 for the track 3 and a delay time t3 of a delay means D3 for the track 4 are determined according to effect parameters designated by the effect parameter information. At the same time, an attenuation g1 of an attenuation means G1 for the track 2, an attenuation g2 of an attenuation means G2 for the track 3 and an attenuation g3 of an attenuation means G3 for the track 4 are determined according to the designated effect parameters. In this case, if the effect parameter information designates the preset effect parameters, the delay times t1 to t3 and the attenuations g1 to g3 are determined according to the preset effect parameters. If the effect parameter information designates the edited effect parameters, the delay times t1 to t3 and the attenuations g1 to g3 are determined according to the effect parameter-editing information. Four sequence data in the tracks 1 to 4, for which the delay times t1 to t3 and the attenuations g1 to g3 are determined, are reproduced by a sequencer SQ having 16 sounding channels.

In this case, the delay times t1 to t3 are determined to gradually increase in this order and the attenuations g1 to g3 are determined to gradually increase in this order so as to simulate a plurality of reflected sounds. More specifically, the musical tones reproduced based on the effect imparting sequence data in the tracks 2 to 4 are outputted after they are delayed and attenuated relative to the musical tones reproduced based on the sequence data in the track 1 by the delay times t1 to t3 and the attenuations g1 to g3. Consequently, the musical tones reproduced based on the sequence data in the tracks 2 to 4 apply a reverberation to the musical tones in the track 1 reproduced based on the sequence data in the track 1 (effect sounding providing a reverberation).

Figure 8:
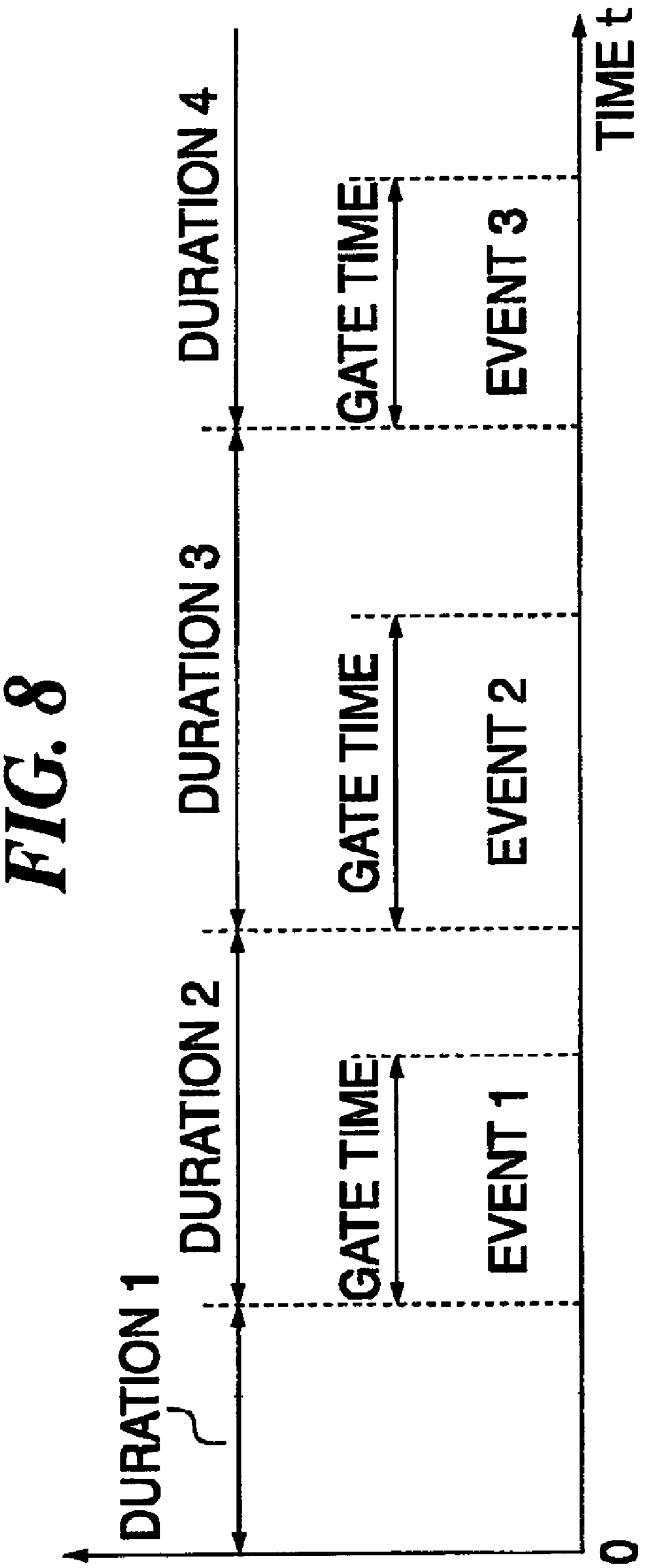
FIG. 8 is a view useful in explaining the application of a reverberation effect to musical tones by a musical composition-reproducing device according to the present invention in relation to duration data.

According to the present embodiment, the delay means D1 to D3 are not constructed of hardware but are implemented by changing the duration data 1 (Duration) at the leading end of the sequence data according to the delay times t1 to t3 as shown in FIG. 8. In other words, all the event data (event data 1, event data 3 . . . ) after the duration data 1 are delayed by period of times indicated by the duration data 1. Further, according to the present embodiment, the attenuation means G1 to G3 are not constructed of hardware but are implemented by inserting control events for controlling the gains of all the channels into the sequence data. In other words, when the sequence data is reproduced by the tone generator group 34, the gains of the musical tones reproduced based on the sequence data in the respective tracks are controlled by the control events. In this reverberation effect imparting process, the system CPU 10 edits the sequence data in the tracks 2 to 4 into the effect imparting sequence data according to the preset effect parameters designated by the effect parameter information or the edited effect parameters while the effect type information designates the reverberation.

Figure 9:
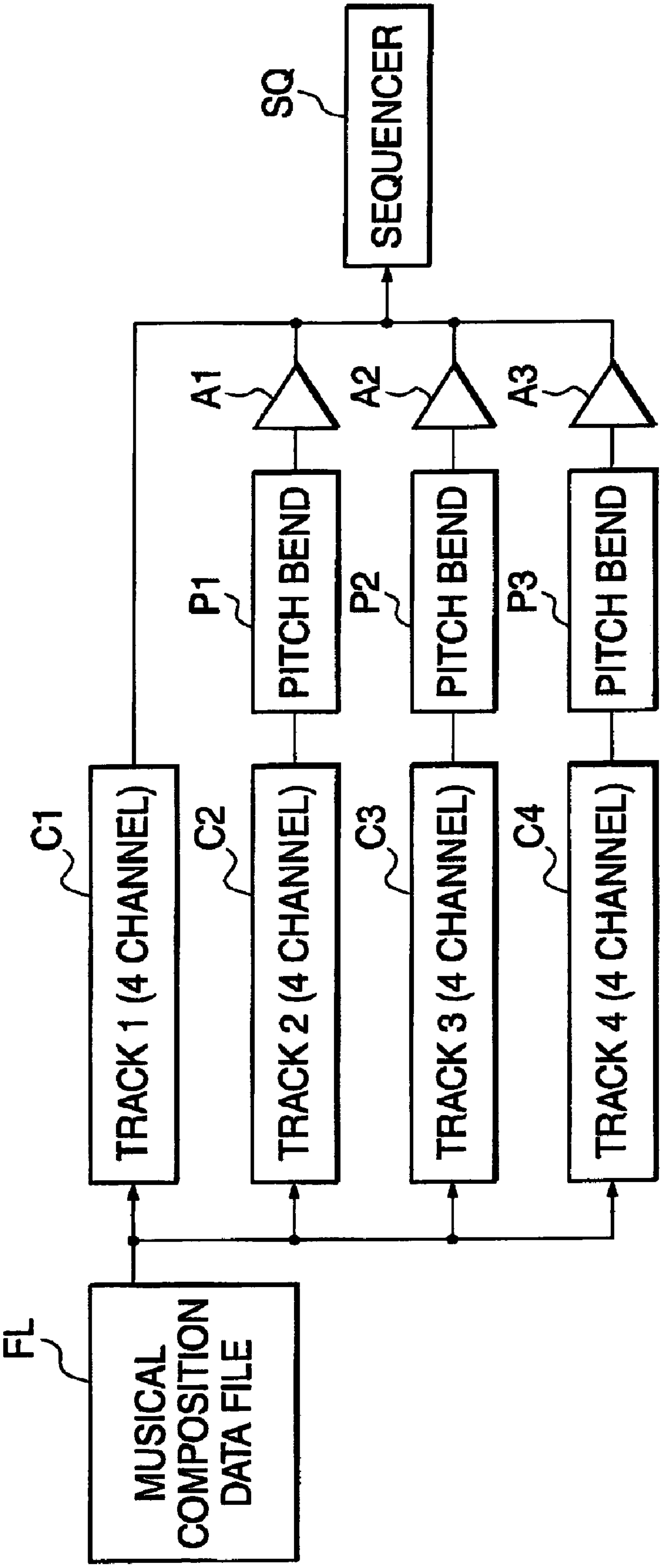
FIG. 9 is a diagram showing the arrangement of an artificial effecter that is comprised of a musical composition-reproducing device according to the present invention and is used to give a chorus effect to musical tones.

Referring next to FIG. 9, there will be described the arrangement of an artificial effecter for use in imparting a chorus effect to musical tones.

In FIG. 9, musical composition data read out from a musical data file FL is sequence data 1 composed of e.g. 4 channels. The sequence data 1 is read out as data of a 4-channel Track 1 and is copied to be read out as data of a 4-channel track 2, data of 4-channel track 3 and data of a 4-channel track 4. The system CPU 10 executes this process when it is determined that the effect imparting information in musical composition data to be reproduced indicates an instruction for performing the effect sounding and the effect imparting sequence information indicates an instruction for imparting an effect to the sequence data 1.

Then, a chorus is designated according to the effect type information, and a pitch bend amount b1 of a pitch bend means P1 for the track 2, a pitch bend amount b2 of a pitch bend means P2 for the track 3 and a pitch bend amount b3 of a pitch bend means P3 for the track 4 are determined according to effect parameters designated by the effect parameter information. At the same time, an amplification a1 of an amplification means A1 for the track 2, an amplification a2 of an amplification means A2 for the track 3 and an amplification a3 of an amplification means A3 for the track 4 are determined according to the designated effect parameters. In this case, if the effect parameter information designates the preset effect parameters, the pitch bend amounts p1 to p3 and the amplifications a1 to a3 are determined according to the preset effect parameters. If the effect parameter information designates the edited effect parameters, the pitch bend amounts p1 to p3 and the amplifications a1 to a3 are determined according to the effect parameter-editing information. Four sequence data in the tracks 1 to 4, for which the pitch bend amounts p1 to p3 and the amplifications a1 to a3 are determined, are reproduced by a sequencer SQ having 16 sounding channels.

In this case, the pitch bend amounts t1 to t3 are determined as being slightly different from one another and the amplifications a1 to a3 are determined as having predetermined respective sizes to thereby simulate a plurality of chorus sounds. In other words, the musical tones reproduced based on the effect imparting sequence data are outputted with a slightly different pitch and a different volume from the musical tones reproduced based on the sequence data in the track 1. Consequently, the musical tones reproduced based on the sequence data in the tracks 2 to 4 apply a chorus effect to the musical tones reproduced based on the sequence data in the track 1 (effect sounding providing a chorus effect).

According to the present embodiment, the pitch bend means P1 to P3 are not constructed of hardware but are implemented by inserting control events for controlling the pitch bend amounts of all the channels into the sequence data. In other words, when the sequence data is reproduced through the tone generator group 34, the gains of the musical tones reproduced based on the sequence data in the respective tracks are controlled by the control events. Further, according to the present embodiment, the amplification means A1 to A3 are not constructed of hardware but are implemented by inserting control events for controlling the gains of all the channels into the sequence data. In other words, when the sequence data is reproduced through the tone generator group 34, the gains of the musical tones reproduced based on the sequence data in the respective tracks are controlled by the control events. In this chorus effect imparting process, the system CPU 10 edits the sequence data in the tracks 2 to 4 into the effect imparting sequence data according to the preset effect parameters designated by the effect parameter information or the edited effect parameters in the case where the effect type information designates the reverberation.

According to the embodiment described above, all the channels in the respective tracks are controlled in the same manner when the reverberation is provided, but the respective channels in the respective tracks may be controlled with different delay times and attenuations.

Moreover, according to the embodiment described above, all the channels in the respective tracks are controlled in the same manner when the chorus effect is provided, but the respective channels in the respective tracks may be controlled with different pitch bends amounts and amplifications. Further, the attenuation means A1 to A3 may be omitted in providing the chorus effect.

There will now be described an effect imparting process which is executed by the system CPU 10 to generate the effect imparting sequence data according to the effect information.

As stated above, the musical composition data is stored in the form of the sequence data provided with the effect information or in the form of the sequence data and the effect imparting sequence data in the system RAM 11 or the musical composition data file section 24. If the musical composition data is stored in the form of the sequence data provided with the effect information, the effect imparting process is executed when the musical composition reproduction is triggered. If the musical composition data is stored in the form of the sequence data and the effect imparting sequence data, the effect imparting process has already been executed. When the musical composition reproduction is triggered in this case, there is no necessity of executing a special process. It is only necessary for the system CPU 10 to forward the musical composition data to the musical composition-reproducing section 15 as is the case with the normal musical composition data composed of a plurality of sequence data.

More specifically, if the musical composition data is stored in the form of the sequence data provided with the effect information, the effect information is referred to when the musical composition reproduction is triggered. If the effect information has no instruction for providing an effect, the musical composition data is forwarded as it is to the FIFO group 32 of the musical composition-reproducing section 15. If the effect information has an instruction for providing an effect, sequence data which should be provided with the effect is specified to produce the effect imparting sequence data. If there is other sequence data than the sequence data which should be provided with the effect, the other sequence data is ignored. If the reverberation is designated as the type of the effect, three effect imparting sequence data with different duration data at the leading end thereof and different gains are produced according to the set effect parameters. In this case, only one control message should be added to control the gains. If the chorus is designated as the type of the effect, the pitch bend amount is determined according to the set effect parameters to thereby produce three effect imparting sequence data with different pitches. In this case as well, only one control message should be added to control the pitches.

According to the above described embodiment, the musical composition-reproducing process and its related processes and the telephone function process carried out, respectively, by the musical composition-reproducing device and the portable terminal device according to the present invention are implemented by executing the program by the system CPU 10. This program is stored in the system ROM 12, but may also be installed into the system RAM 11 from the external device 20. The installation of the program from the external device 20 makes it possible to easily replace the program with another program, upgrade the version of the program and the like. In this case, the external device 20 may be used as a drive for a removable disk such as a CD-ROM, an MO and an HDD.

Further, the tone generators 1 to 4 in the tone generator group 34 of the musical composition-reproducing section 15 may be formed by frequency-modulation (FM) tone generators. The FM tone generator uses higher harmonics generated by the frequency modulation to synthesize musical tones and is able to generate waveforms having higher harmonic waves containing non-harmonic components using a simple circuit. Further, the FM tone generator is able to generate musical tones over a wide range from composite tones of natural musical instruments to electronic tones. The FM tone generator uses oscillators called operators that oscillate sine waves equivalently. For example, as the tone generators 1 to 4, it is possible to use an FM tone generator that is formed by cascading a first operator and a second operator. In this case, the number of operators used is not limited to two but also may be three or more. An alternative FM tone generation may be used in which the outputs from the operators are fed back to the same operators.

Further, the tone generators 1 to 4 in the tone generator group 34 of the musical composition-reproducing section 15 need not be formed by FM tone generators, but they may also be another type of tone generators such as a waveform memory tone generator (PCM tone generator or ADPCM tone generator) and a physical model tone generator. In addition, the tone generators may be either hardware tone generators implemented by using a DSP, etc. or software generators implemented by executing a tone generation program.

Further, the portable terminal device according to present invention is by no means applied to only a cellular phone as described above, but it may be applied to various kinds of mobile devices, such as personal computers and other information devices, insofar as they include a musical composition-reproducing device according to the present invention.

INDUSTRIAL APPLICABILITY

The musical composition-reproducing device according to the present invention is capable of effect sounding imparting an effect to musical tones that are reproduced, by using free sounding channels, in reproducing sequence data. This makes it possible to make the most of the sounding channels in the musical composition-reproducing device.

Moreover, if there is no free sounding channel when musical composition data composed of a plurality of sequence data is reproduced, the number of sequence data reproduced is reduced to enable the effect sounding imparting the effect to musical tones that are reproduced, by using sounding channels having been freed as a result of the reduction.

Thus, according to the present invention, an effect is not imparted to musical tones by a special effect circuit but is imparted by using free sounding channels or freed sounding channels. This eliminates the necessity of additionally providing an effect circuit. Therefore, the musical composition-reproducing device according to the present invention can be suitably applied to a cellular phone, etc. that is required to be compact in size.

The invention claimed is:

1. A musical composition-reproducing device comprising:

a musical composition-reproducing unit that has n×m sounding channels, and reproduces musical composition data each comprised of m sequence data including performance data of n channels, wherein n is a positive integer and m is an integer of not less than 2;

a detecting unit that detects a number k of sequence data of musical composition data to be reproduced by said musical composition-reproducing unit; and a control unit that controls said musical composition-reproducing unit to reproduce the sequence data of the musical composition data by using a part of the n×m sounding channels when the detected number k of the sequence data is less than the number m of sequence data that can be reproduced by said musical composition-reproducing unit while generating an effect sound related to the sequence data being reproduced by using at least one free channel among the n×m sounding channels.

2. A musical composition-reproducing device according to claim 1, wherein said control unit controls said musical composition-reproducing unit so as to copy at least one sequence data to be reproduced and change control information for sequence data obtained by the copying according to at least one effect parameter to thereby generate at least one effect imparting sequence data, and reproduce the at least one sequence data and the generated at least one effect imparting sequence data.

3. A musical composition-reproducing device according to claim 1, wherein if effect information is added to at least one sequence data among the k sequence data, said control unit controls said musical composition-reproducing unit so as to copy the at least one sequence data and change control information for sequence data included in the copied sequence data, according to the effect information to thereby generate at least one effect imparting sequence data, and generate the effect sound by reproducing the generated at least one effect imparting sequence data by using the at least one free channel.

4. A musical composition-reproducing device comprising:

a musical composition-reproducing unit that has n×m sounding channels, and reproduces musical composition data each comprised of m sequence data including performance data of n channels, wherein n is a positive integer and m in an integer of not less than 2; and a control unit that controls said musical composition-reproducing to reproduce k sequence data among the m sequence data included in the musical composition data using k×n sounding channels among the n×m sounding channels while generating an effect sound related to at least one sequence data among the k sequence data by using at least one free channel among n×(m−k) sounding channels, wherein k is a positive integer that is less than m.

5. A portable terminal device comprising:

a musical composition-reproducing device comprised of a musical composition-reproducing unit that has n×m sounding channels, and reproduces musical composition data each comprised of m sequence data including performance data of n channels, and a control unit that controls said musical composition-reproducing unit to reproduce k sequence data included in the musical composition data by using k×n sounding channels among the n×m sounding channels while generating an effect sound related to at least one sequence data among the k sequence data by using at least one free channel among n×(m−k) sounding channels, wherein n is a positive integer, m is an integer of not less than 2, and k is a positive integer that is less than m, and said musical composition-reproducing device reproduces the musical composition data to thereby output an incoming call melody or a hold sound provided with the at least one effect.

6. A portable terminal device comprising:

a musical composition-reproducing device comprised of a musical composition-reproducing unit that has n×m sounding channels, and reproduces musical composition data each comprised of m sequence data including performance data of n channels, and a control unit that controls said musical composition-reproducing unit to reproduce k sequence data included in the musical composition data by using k×n sounding channels among the n×m sounding channels while generating an effect sound related to at least one sequence data among the k sequence data by using at least one free channel among $n\times(m-k)$ sounding channels, wherein n is a positive integer, m is an integer of not less than 2, and k is a positive integer that is less than m;

a storage device that stores the musical composition data; and a reading device that reads the musical composition data from said storage device, wherein said musical composition-reproducing device reproduces the musical composition data read by said reading device to thereby reproduce a musical composition provided with at least one effect.

7. A musical composition-reproducing method comprising:

reproducing musical composition data each comprised of m sequence data including performance data of n channels by using $n\times m$ sounding channels, wherein n is an integer;

detecting a number k of sequence data of musical composition data to be reproduced during reproduction of the musical composition data; and controlling the reproduction of the musical composition data so as to reproduce the sequence data of the musical composition data by using a part of the $n\times m$ sounding channels when the detected number k of the sequence data is less than the number m of sequence data that can be reproduced during reproduction of the musical composition data while generating an effect sound related to the sequence data being reproduced by using at least one free channel among the $n\times m$ sounding channels.

8. A musical composition-reproducing method comprising:

reproducing musical composition data each comprised of m sequence data including performance data of n channels by using $n\times m$ sounding channels, wherein n is an integer and m is an integer of not less than 2; and controlling the reproduction of the musical composition data so as to reproduce k sequence data included in musical composition data by using $k\times n$ sounding channels among $n\times m$ sounding channels while generating an effect sound related to at least one sequence data among the k sequence data by using at least one free channel among $n\times(m-k)$ sounding channels, wherein k is a positive integer that is less than m.

9. A musical composition-reproducing device according to claim 3, wherein when the musical composition data is comprised of sequence data and effect imparting sequence data, said control unit controls said musical composition-reproducing unit so as to reproduce the sequence data of the musical composition data by using a part of the $n\times m$ sounding channels without generating the effect imparting sequence data, and generate the effect sound by reproducing the effect imparting sequence data by using at least one free channel among the $n\times m$ sounding channels.

* * * * *